United States Patent
Donderici (10) Patent No.: US 12,545,293 B2
(45) Date of Patent: Feb. 10, 2026

(54) CONTINUOUS LEARNING MACHINE USING CLOSED COURSE SCENARIOS FOR AUTONOMOUS VEHICLES

(71) Applicant: GM Cruise Holdings LLC, San Francisco, CA (US)

(72) Inventor: Burkay Donderici, Burlingame, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 1061 days.

(21) Appl. No.: 17/577,810

(22) Filed: Jan. 18, 2022

(65) Prior Publication Data

US 2023/0227069 A1     Jul. 20, 2023

(51) Int. Cl.
- *B60W 60/00* (2020.01)
- *G05B 13/02* (2006.01)
- *G06V 10/774* (2022.01)

(52) U.S. Cl.
CPC ..... *B60W 60/0015* (2020.02); *G05B 13/0265* (2013.01)

(58) Field of Classification Search
CPC ................ B60W 60/0015; G05B 13/0265
See application file for complete search history.

(56) References Cited

U.S. PATENT DOCUMENTS

| | | | |
|---|---|---|---|
| 10,792,810 B1 * | 10/2020 | Beckman | B25J 9/163 |
| 10,909,629 B1 * | 2/2021 | Madigan | G07C 5/008 |
| 2017/0132117 A1 * | 5/2017 | Stefan | G06F 11/3684 |
| 2018/0313724 A1 * | 11/2018 | Yang | G06F 18/217 |
| 2020/0285560 A1 * | 9/2020 | Nagano | G06F 11/079 |
| 2023/0102929 A1 * | 3/2023 | Sjolin | G08G 1/167 701/25 |
| 2023/0315939 A1 * | 10/2023 | Ramanath | G06F 11/3684 703/22 |

OTHER PUBLICATIONS

Robell, Philipp, et al; "Safety First for Automated Driving", Whitepapers Baidu, dated Jan. 31, 2019, pp. 1-157.
Wishart, Jeffrey et al; "Literature Review of Verification and Validation Activities of Automated Driving Systems", SAE International Journal of Connected and Automated Vehicles, dated Mar. 31, 2020, pp. 267-323.
European Search Report dated Jun. 1, 2023; Application No. 22207911.3.

* cited by examiner

*Primary Examiner* — Scott A Browne
*Assistant Examiner* — Rami Nabih Bedewi
(74) *Attorney, Agent, or Firm* — CANTOR COLBURN LLP (57) ABSTRACT

The present technology pertains to obtaining sensor data and processed sensor data related to a base world scenario encountered by an AV entity. The sensor data and processed sensor data may be assessed to determine an importance value for the base world scenario. When the importance value is above a threshold, a closed course staging system may stage a re-creation of the base world scenario in a closed course environment (i.e., a closed course scenario). An AV may then interact with the closed course scenario. Sensor data and processed sensor data from the AV's interaction with the closed course scenario may then be added to training data used to train ML models for AVs.

20 Claims, 6 Drawing Sheets

CONTINUOUS LEARNING MACHINE USING CLOSED COURSE SCENARIOS FOR AUTONOMOUS VEHICLES

TECHNICAL FIELD

The subject matter of this disclosure relates in general to the field of autonomous vehicles, and more particularly, to systems and methods for improving continuous learning for autonomous vehicles by re-creating in a closed course environment certain scenarios encountered by AVs.

BACKGROUND

An Autonomous Vehicle (AV) is a motorized vehicle that can navigate without a human driver. The AV can include a plurality of sensor systems, such as a camera system, a Light Detection and Ranging (LIDAR) system, a Radio Detection and Ranging (RADAR) system, and so on. The AV may operate based upon sensor signal output of the sensor systems. For example, the sensor signals can be provided to a local computing system in communication with the plurality of sensor systems, and a processor can execute instructions based upon the sensor signals to control one or more mechanical systems of the AV, such as a vehicle propulsion system, a braking system, a steering system, and so forth.

The AV may depend on geographic and spatial (geospatial) data to localize itself (e.g., obtain its position and orientation (pose)) and other objects within its immediate surroundings, determine routes towards destinations, and to coordinate motor controls to maneuver safely and efficiently while in transit, among other operations. The AV geospatial data can include the various dimensions or attributes (e.g., Global Positioning System (GPS) coordinates; polygon vertices; polyline vertices; length, width, height; radial distance, polar angle; etc.) of physical places and things (e.g., streets, lanes, crosswalks, sidewalks, medians, traffic signal poles, traffic signs, etc.). The AV geospatial data can also include abstract or semantic features (e.g., speed limits, carpool lanes, bike lanes, crosswalks, intersections, legal or illegal U-turns, traffic signal lights, etc.) that the AV can evaluate to determine the next set of actions it may take for a given situation. For example, an intersection tagged as a permissive left turn may indicate that it is legal for the AV to turn left on a solid green traffic signal light so long as the AV yields to any oncoming traffic (i.e., other objects). The annotation of locations, objects, and features can require at least some human intervention, such as the manual labeling of certain areas, physical things, or concepts; quality assurance review of computer-generated geospatial observations; computer-aided design of maps; and so on. In order to prepare an AV for navigating autonomously, a machine learning model may use information about one or more environments surrounding any number of AVs as input. Such input may allow the machine learning model to be trained to recognize, assess, and/or react to such environments. In order to improve AV response to environments, AVs are often tested.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

In general, embodiments described herein relate to systems, methods, and instructions on non-transitory computer-readable media for improved learning for a continuous learning machine for autonomous vehicles (AVs). Specifically, embodiments described herein relate to finding important scenarios that an AV may encounter, which may be, for example, scenarios that do not occur frequently but may have negative consequences if encountered by an AV with a machine learning model that is not sufficiently trained to handle the scenario safely due to lack of sufficient training data that includes the scenario. Such scenarios may be identified from AVs navigating in the real world, or may be derived from computer simulations.

Sensor data from one or more AV entities (e.g., a real or simulated AV) may be processed, and the sensor data and processed sensor data may be used to determine an importance value of a scenario. In one or more embodiments, if a determination is made that a given scenario has a certain level of importance (e.g., it is an edge case in which abnormal or unsafe sensor data or AV responses occurred), then the sensor data (i.e., raw data from the sensors of an AV entity) and processed sensor data (e.g., objects in the scenario have been identified) may be provided to a closed course staging system. The abnormal sensor data may comprise of object data that are of rare occurrence such as pedestrians in unusual costumes, pedestrians carrying unusual large objects, road signs or traffic lights that are meant not be used (being transported or stored), large objects that are moving due to wind or act of gravity. Unsafe sensor data may be AV hitting other objects on the road, or making sudden moves (turns, acceleration, deceleration) that are uncomfortable or unsafe.

In one or more embodiments, the closed course staging system may attempt to physically realize (i.e., stage) the scenario in a closed course environment. Staging the scenario may include, for example, communicating with robotic or human agents in the closed course environment to manipulate objects in the closed course environment to re-create the scenario (e.g., to place the same or similar objects as appear in the scenario in same or similar positions within the closed course environment). Such objects may include, but are not limited to, other vehicles, inflatable facsimiles of objects (e.g., vehicles, pedestrians, vegetation, signs, etc.). Staging the scenario may also include positioning screens to create three dimensional renderings of aspects of the scenario. Rendering may be performed based on the position of the screens and the position of the AV. Other actions may be performed to stage the scenario without departing from the scope of embodiments described herein.

In one or more embodiments, once the closed course staging system has staged an approximation of the scenario, a difference value is determined. In one or more embodiments, a difference value is any data item (e.g., a number, a score, etc.) that represents the aggregated differences between the scenario encountered by the AV entity, and the staged scenario generated by the closed course staging system. In one or more embodiments, the closed course environment may not, for example, have available all objects in the base scenario, or objects that are the same size and able to be oriented in the same way. Therefore, in one or more embodiments, generating a difference value may include identifying what objects present in the base scenario are not present in the staged scenario. Generating the difference value may also include, for objects that do exist in the staged scenario, determining the differences in the size and orientation of the objects relative to the objects in the base scenario. The differences may be absolute differences of the entities (such as difference in width, difference in height, difference in red, green, blue, color components). The differences may be relative or percentage differences that are normalized with an absolute value of the entities.

In one or more embodiments, after the difference value has been generated, the closed course staging system may initiate an interaction between an AV and the staged scenario in the closed course environment. The AV may attempt to navigate the staged scenario, perceiving the staged scene with its sensors, processing the sensor data, and using trained machine learning models to make navigation decisions. In order to increase the variety of data gained from testing the AV in the staged scene, any number of variations of the staged scenario may be set up by the closed course staging system for any number of test runs by the AV.

In one or more embodiments, for each test run in the variations of the staged scenario, sensor data and processed sensor data from the AV is obtained from the AV. The data from the various test runs may then be assessed, and assigned a relevance value. The relevance value may be based on the actions of the AV during the test run. As an example, if the behavior of the AV while attempting to navigate the staged scenario was unexpected, abnormal, or unsafe, the relevance value for that test run may be higher.

In one or more embodiments, the data obtained from one or more of the test runs may then be used to adjust machine learning models to be used by AVs in the real world. Such adjustment may be achieved, for example, by adding the data from the one or more test runs to a set of training data being used to train the machine learning model(s). In one or more embodiments, test runs in simulated scenarios that are closer to the base scenario (e.g., have a lower difference value), test runs with a higher relevance score, or a combination thereof, may be determined to be higher quality, and thus more important for use in adjusting the machine learning models of an AV. Therefore, data from such test runs may be used to make larger adjustments to the machine learning models. For example, more instances of particularly high quality test run data may be added to the training data set for the machine learning models of AVs. Adjusting the machine learning models may comprise adjusting the weights or biases of fully connected, convolutional or other neural network layers as a result of re-training the model. Adjusting the machine learning models may comprise adjusting any of the parameters of the pre-processing, neural network or post-processing algorithms.

In one or more embodiments, an AV using one or more machine learning models to navigate that have been trained using additional training data from important scenarios re-created in closed course environments are better prepared to respond appropriately when the scenario is encountered on the road. Embodiments described herein may allow for continuous learning for machine learning model(s) of an AV that incorporates a greater amount of data from scenarios that may be important, but encountered infrequently. Additionally, the learning may incorporate data from a real AV in a physical closed course environment, which may have advantages relative to purely computer simulated data, as the closed course environment allows the AV to encounter the detailed physics present in the real world. For example, testing an AV in a physical closed course environment obtains data from an AV that encountered real road conditions (i.e., surfaces having friction), using real sensors to perceive the environment, with real compute hardware (e.g., that have real-world latencies), exhibiting real vehicle dynamics, etc.

In one or more embodiments, the above-described scenario may be repeated any number of times with new important base scenarios being tested in closed course environments, thereby continuously providing closed course environment test data for training, and thus improving one or more machine learning models for AVs.

Figure 1:
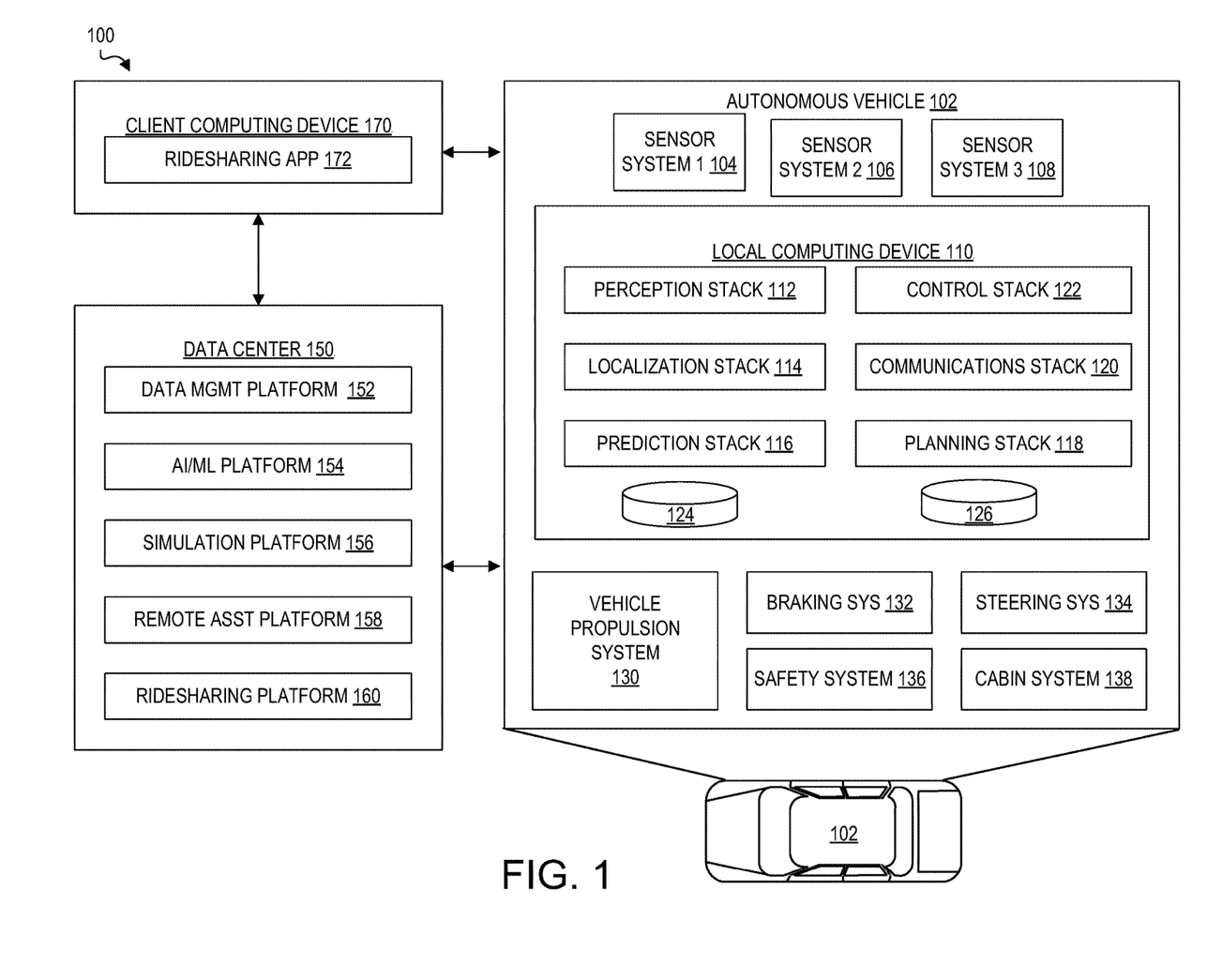
FIG. 1 illustrates an example of a system for managing one or more Autonomous Vehicles (AVs) in accordance with some aspects of the present technology.

Turning now to the drawings, FIG. 1 illustrates an example of an autonomous vehicle (AV) management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). The bounding area may by defined on grid that consists of a rectangular, cylindrical or spherical projection of the camera or LIDAR data.

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point. In some embodiments, the prediction stack 116 can output a probability distribution of likely paths or positions that the object is predicted to take.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
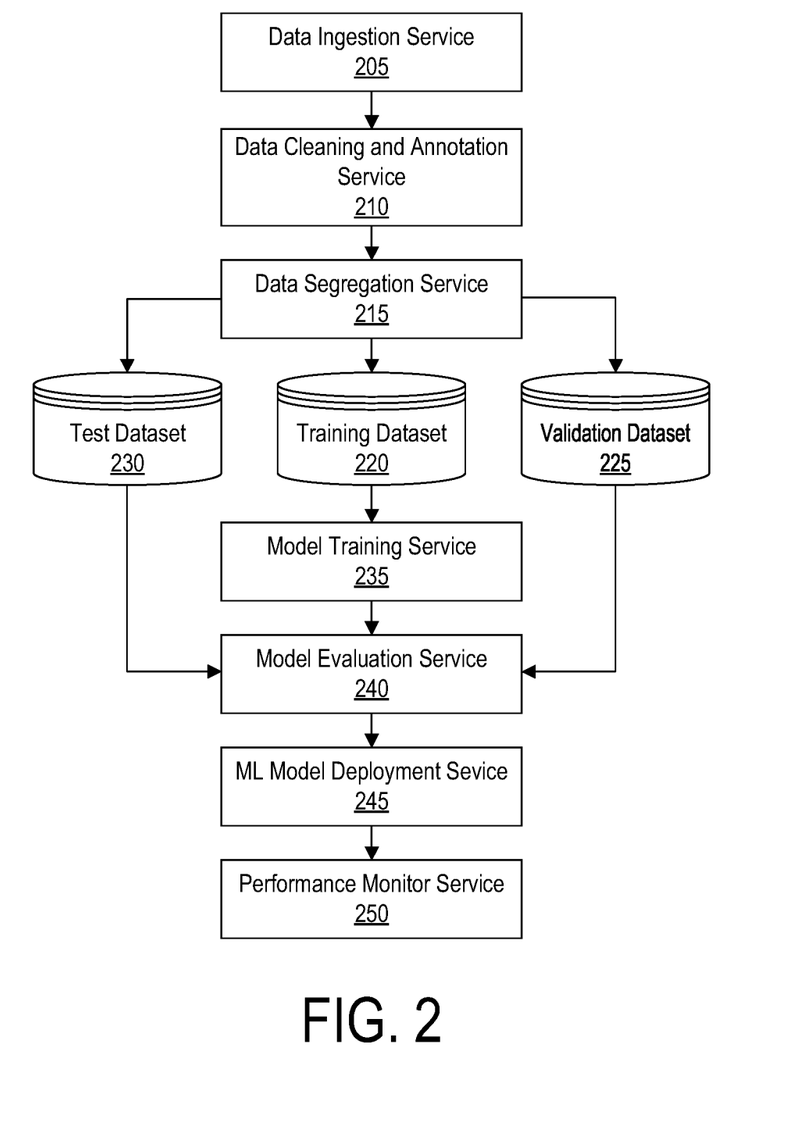
FIG. 2 illustrates an example lifecycle of a machine learning (ML) model according to an example of the instant disclosure.

FIG. 2 illustrates an example lifecycle 200 of a machine learning (ML) model in accordance with some examples. The first stage of the lifecycle 200 of an ML model is a data ingestion service 205 to generate datasets described below. ML models require a significant amount of data for the various processes described in FIG. 2 and the data may be persisted without undertaking any transformation to have an immutable record of the original dataset. The data itself can be generated by sensors attached to an AV, for example, but can also be provided from third-party sources such as publicly available dedicated datasets used for research purposes, computer simulations of scenarios an AV may encounter, etc. The data ingestion service 205 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data (e.g., an AV) from the consumer of the data (e.g., an ML model training pipeline). For offline data production, when source data is available from the producer (e.g., the AV), the producer publishes a message and the data ingestion service 205 retrieves the data. In some examples, the data ingestion service 205 may be online and the data is streamed from the producer (e.g., the AV) in real-time for storage in the data ingestion service 205.

After data ingestion service 205, a data preprocessing service preprocesses the data to prepare the data for use in the lifecycle 200 and includes at least data cleaning, data transformation, and data selection operations. The data preprocessing service 210 removes irrelevant data (data cleaning) and general preprocessing to transform the data into a usable form. In some examples, the data preprocessing service 210 may convert 2D LIDAR data (e.g., 2D point cloud data) into voxels. The data preprocessing service 210 may include labeling of features relevant to the ML model such as, for example, people, vegetation, vehicles, and structural objects in the case of an AV. In some examples, the data preprocessing service 210 may be a semi-supervised process performed by an ML model to clean and annotate data that is complemented with manual operations such as labeling of error scenarios, identification of untrained features, etc.

After the data preprocessing service 210, data segregation service 215 separates data into at least a training dataset 220, a validation dataset 225, and a test dataset 230. Each of the training dataset 220, a validation dataset 225, and a test dataset 230 are distinct and do not include any common data to ensure that evaluation of the ML model is isolated from the training of the ML model.

The training dataset 220 is provided to a model training service 235 that uses a supervisor to perform the training, or the initial fitting of parameters (e.g., weights of connections between neurons in artificial neural networks) of the ML model. The model training service 235 trains the ML model based on a gradient descent or stochastic gradient descent to fit the ML model based on an input vector (or scalar) and a corresponding output vector (or scalar). Training of the ML model adjusts the parameters of the ML model such as weights and biases of the fully connected or convolutional neural network layers.

After training, the ML model is evaluated at a model evaluation service 240 using data from the validation dataset 225 and different evaluators to tune the hyperparameters of the ML model. The predictive performance of the ML model is evaluated based on predictions on the validation dataset 225 and iteratively tunes the hyperparameters based on the different evaluators until the best fit for the ML model is identified. After the best fit is identified, the test dataset 230, or holdout data set, is used as a final check to perform an unbiased measurement on the performance of the final ML model by the model evaluation service 240. In some cases, the final dataset that is used for the final unbiased measurement can be referred to as the validation dataset and the dataset used for hyperparameter tuning can be referred to as the test dataset.

After the ML model has been evaluated by the model evaluation service 240, an ML model deployment service 245 can deploy the ML model into an application or a suitable device. The deployment can be into a further test environment such as a simulation environment, or into another controlled environment to further test the ML model. In the case of an AV, the ML model may need to undergo further evaluation inside a simulated environment and, after further validation, could be deployed in the AV. In some examples, the ML model could be implemented as part of the perception stack 112 to detect objects.

After deployment by the ML model deployment service 245, a performance monitor service 250 monitors for the performance of the ML model. In some cases, the performance monitor service 250 can also record performance data such as driving data that can be ingested via the data ingestion service 205 to provide further data, additional scenarios, and further enhance the training of ML models.

Figure 3:
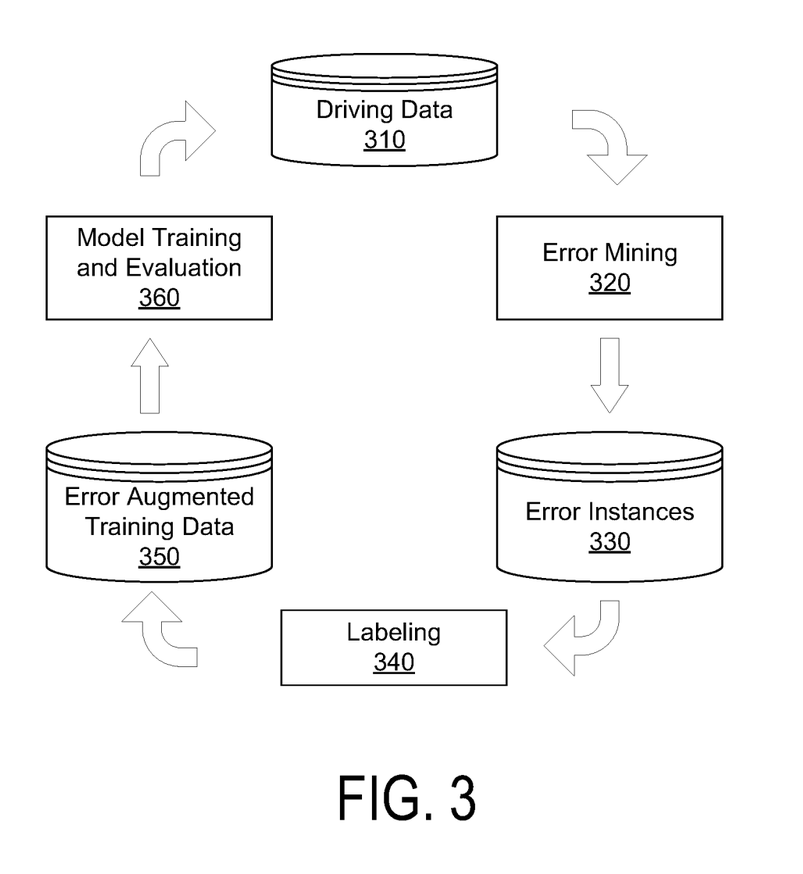
FIG. 3 illustrates an example diagram of a Continuous Learning Machine (CLM) for resolving uncommon scenarios in an AV according to an example of the instant disclosure.

FIG. 3 illustrates an example diagram of a continuous learning machine (CLM) 300 that solves long-tail prediction problem in an AV in accordance with some examples. The CLM 300 is a continual loop that iterates and improves based on continual feedback to learn and resolve driving situations experienced by the AV.

The CLM 300 begins with a fleet of AVs that are outfitted with sensors to record real-world driving scenes. In some cases, the fleet of AVs is situated in a suitable environment that represents challenging and diverse situations such as an urban environment to provide more learning opportunities. The AVs record the driving situations into a collection of driving data 310.

The CLM 300 includes an error mining 320 to mine for errors and uses active learning to automatically identify error cases and scenarios having a significant difference between prediction and reality, which are added to a dataset of error instances 330. The error instances are long-tail scenarios that are uncommon and provide rich examples for simulation and training. The error instances 330 store high-value data and prevents storing datasets with situations that are easily resolved.

The CLM 300 also implements a labeling function 340 that includes both automated and manual data annotation of data that is stored in error augmented training data 350 and used for future predictions. The automated data annotation is performed by an ML labeling annotator that uses a neural network trained to identify and label error scenarios in the datasets. Using the ML labeling annotator enables significant scale, cost, and speed improvements that allow the CLM 300 to cover more scenario of the long tail. The labeling function 340 also includes functionality to allow a human annotator to supplement the ML labeling function. By having both an automated ML labeling function and a manual (human) labeling annotator, the CLM 300 can be populated with dense and accurate datasets for prediction.

The final step of the CLM 300 is model training and evaluation 360. A new model (e.g., a neural network) is trained based on the error augmented training data 350. In one or more embodiments, the error augmented training data 350 may include data obtained from AVs tested in a closed course environment. Such tests may be performed in closed course scenarios staged by a closed course staging device. In one or more embodiments, the closed course scenarios are based in scenarios seen by AVs in the real world, or computer generated scenarios. Such scenarios may be assessed to determine an importance value for the scenario.

In one or more embodiments, the new model is tested extensively using various techniques to ensure that the new model exceeds the performance of the previous model and generalizes well to the nearly infinite variety of scenarios found in the various datasets. The model can also be simulated in a virtual environment and analyzed for performance. Once the new model has been accurately tested, the new model can be deployed in an AV to record driving data 310. The CLM 300 is a continual feedback loop that provides continued growth and learning to provide accurate models for an AV to implement.

In practice, the CLM can handle many uncommon scenarios, but the AV will occasionally need to account for new and infrequent scenarios that would be obvious to a human. For example, an AV may encounter another motorist making an abrupt and sometimes illegal U-turn. The U-turn can be at a busy intersection or could be mid-block, but the U-turn will be a sparse data point as compared to more common behaviors such as moving straight, left turns, right turns, and lane changes. Applying CLM principles, an initial deployment model may not optimally predict U-turn situations and error situations commonly include U-turns. As the dataset grows and more error scenarios of U-turns are identified, the model can be trained to sufficiently predict a U-turn and allow the AV to accurately navigate this scenario. For example, long-tail scenarios may be considered important relative to non-long-tail scenarios. In order to grow the data set, and thereby improve the CLM, such scenarios may be identified as important, and re-created (or at least approximately re-created) in a closed course environment using sensor data and processed sensor data from an AV that encountered the scenario. Variations of the scenarios may also be re-created in the closed course environment. In one or more embodiments, an AV may then interact with the staged scenarios, and variations thereof. Sensor data and processed sensor data from the AV may then be obtained from the AV. Such data may then be added to the error augmented training data set 350 for use in ML model training, thereby improving the CLM more quickly than may otherwise be achieved without such additional training data.

The CLM 300 can be applied to any number of scenarios that a human will intuitively recognize including, for example, a K-turn (or a 3-point turn), lane obstructions, construction, pedestrians, animated objects, animals, emergency vehicles, funeral processions, jaywalking, and so forth, any of which may be re-created in a staged scenario in a closed course environment in order to increase the amount of data relating to such scenarios in the training data set for the CLM. The CLM 300 provides a mechanism for continued learning to account for diverse scenarios that are present in the physical world.

Figure 4:
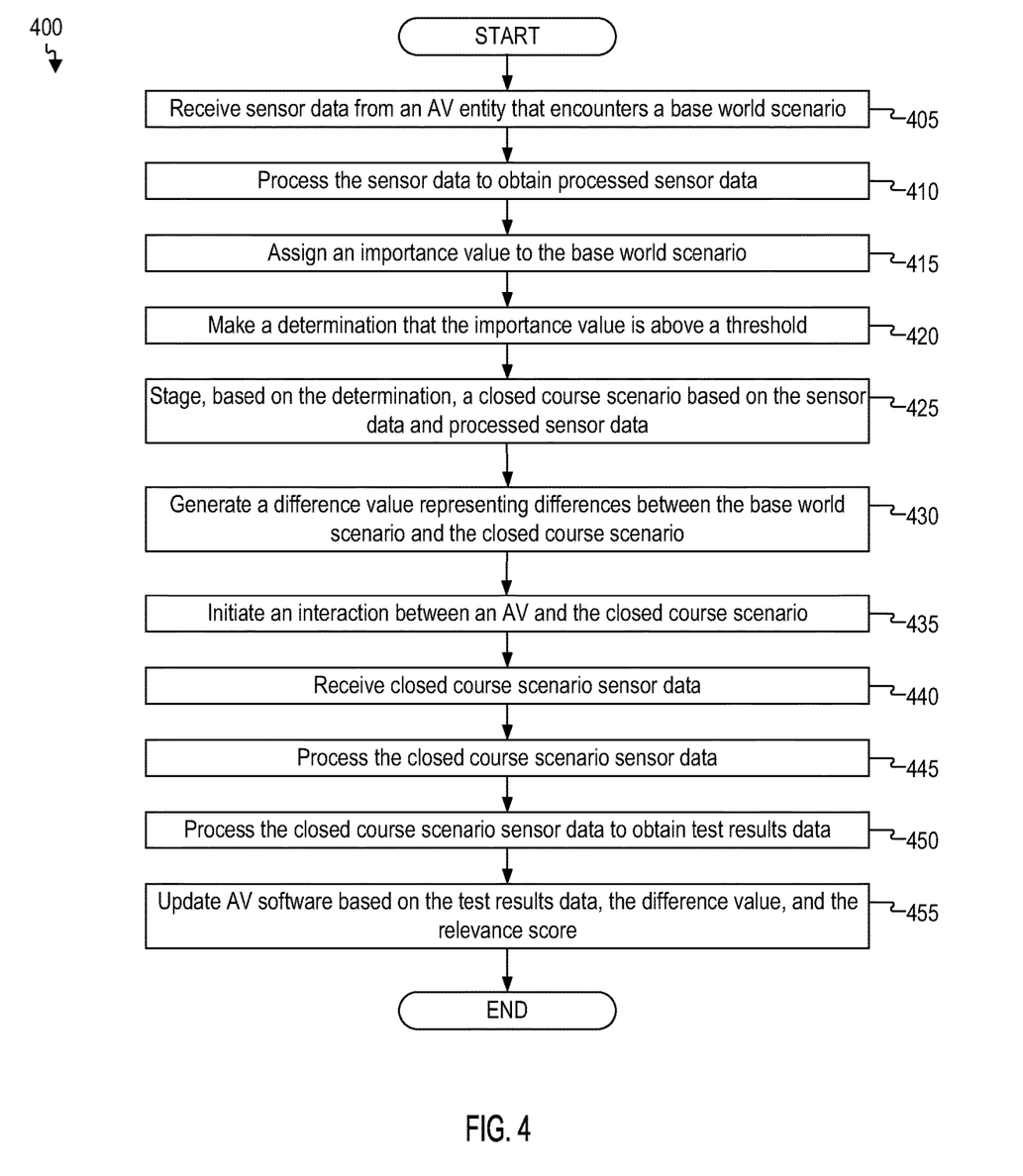
FIG. 4 is a flowchart of a method for continuous learning for machine learning models of autonomous vehicles (AVs) according to an example of the instant disclosure.

FIG. 4 illustrates an example method 400 for continuous learning for machine learning models of autonomous vehicles (AVs). Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method includes receiving sensor data from an AV entity at step 405. For example, a closed course staging system operatively connected to the AV entity may receive sensor data from an AV entity. The sensor data may be obtained from a base world scenario perceived by the AV entity. The base world scenario may be a real world scenario when AV entity is a physical AV. The base world scenario may be a computer simulated scenario and the AV entity is a simulated AV. In one or more embodiments, the sensor data is any data from any sensor of the AV entity (e.g., image data, LIDAR data, RADAR data, etc.).

According to some embodiments, the method includes processing the sensor data to obtain processed sensor data at step 410. For example, a closed course staging system operatively connected to the AV entity may process the sensor data to obtain processed sensor data. Additionally or alternatively, the sensor data, in whole or in part, may be processed by the AV entity, and provided to the closed course staging device. Processing sensor data to obtain processed sensor data may include any form of data processing to augment, transform, etc. the sensor data. For example, sensor data may be processed to identify and label any number of objects in the base world scenario encountered by the AV entity.

According to some embodiments, the method includes assigning an importance value to the base world scenario at step 415. For example, the a closed course staging system operatively connected to the AV entity may assign an importance value to the base world scenario. In one or more embodiments, assigning an importance value is based on the content of the sensor data and the processed sensor data. Edge cases (e.g., long-tail scenarios) in which the scenario, or aspects thereof, were abnormal, unsafe, etc. may be assigned a higher importance value than scenarios without such characteristics. An importance value may be any representation of the relative importance of a scenario. As an example, the importance value may be a numerical value that is determined, at least in part, based on the frequency with which such scenarios have been encountered by AVs, the importance score increasing inversely relative to the frequency with which AVs encounter the scenario (i.e., less frequent scenarios may have higher importance values). Additionally or alternatively, an importance value assigned to a scenario may be assigned or adjusted based on other characteristics of the scenario. Examples of such characteristics include, but are not limited to, abnormal actions of other actors (e.g., vehicles, pedestrians, etc.) in the scenario, that a crash occurred in the scenario, the AV performed an unsafe action (rapid acceleration, deceleration or turns) in the scenario, that one or more unexpected objects (pedestrians carrying large objects, pedestrians with unusual costumes, traffic signs or lights that are in transport or stored on the side of the road) appear in the scenario, etc.

According to some embodiments, the method includes making a determination that the importance value is above an importance value threshold at step 420. For example, a closed course staging system operatively connected to the AV entity may make a determination that the importance value is above an importance value threshold. In one or more embodiments, an importance value threshold is a threshold that determines if the base world scenario encountered by the AV entity is important enough to re-create in a closed course environment for the purpose of obtaining more AV sensor data and processed sensor data related to the scenario to augment the training data set of one or more ML models to be used by AVs.

According to some embodiments, the method includes staging, in response to the determination, a closed course scenario based on the sensor data and the processed sensor data at step 425. For example, a closed course staging system operatively connected to the AV entity may stage, in response to the determination, a closed course scenario based on the sensor data and the processed sensor data. In one or more embodiments, staging the closed course scenario includes attempting to re-create the base world scenario in a closed course environment. In one or more embodiments, a closed course environment is an environment in which closed course testing may occur. A closed course environment may be, for example, a closed set of roads or other closed environment separated from other roads, environments, external traffic, pedestrians, etc. In one or more embodiments, resources in the closed course environment may not be sufficient to exactly re-create the base world scenario. In such instances, staging the closed course scenario may include approximating the base world scenario as closely as is possible with the resources available in the closed course environment. Staging the closed course scenario may include the close course staging device communicating with entities within the closed course environment to position resources within the closed course environment to re-create or approximate the base world scenario. As an example, the closed course staging system may communicate with robotic assets within the closed course environment to position objects, and/or to maneuver the objects during the scenario. As another example, the closed course staging system may communicate with humans in the closed course environment to position objects, or to maneuver the objects during the scenario. Where possible, objects in the closed course scenario may be the same as objects in the base world scenario. When identical objects are not available, other objects may be used in the closed course scenario to represent objects in the base world scenario, such as, for example, inflatable objects, other AVs present in the closed course environment, screens to create two or three dimensional renderings of all or any portion of the environment of the base world scenario, crash test dummies, robotic entities, drones, etc.

According to some embodiments, the method includes generating a difference value representing differences between the closed course scenario and the base world scenario at step 430. For example, a closed course staging system may generate a difference value representing differences between the closed course scenario and the base world scenario. In one or more embodiments, generating a difference value comprises performing a comparison between the base world scenario and the close course scenario. In one or more embodiments, performing the comparison includes identifying objects that are present in the base world scenario but not in the closed course scenario. Additionally, performing the comparison may include quantifying differences in shape and orientation of an object present in the base world scenario and represented by a non-identical object in the closed course scenario. The generated difference value may be any form of information capable of representing the assessed differences between the base world scenario and the closed course scenario. The generated difference value may be absolute difference in coordinates of base world scenario and closed course scenario objects. The generated difference value may be absolute difference in orientation of base and close course objects. The generated difference value may be relative difference of any property of base and close course objects, normalized by the absolute values of any of the properties. The properties of objects that are used in the comparison may be measured by using the closed course staging system, or by the AV itself.

According to some embodiments, the method includes initiating an interaction between an AV and the closed course scenario at step 435. For example, a closed course staging system may initiate an interaction between an AV and the closed course scenario. The interaction may one of a plurality of interactions between the AV and variations of the closed course scenario. For example, to increase the amount of sensor data and processed sensor data obtained in the closed course environment related to the base world scenario, any number of variations (e.g., different placement and/or movement of objects) of the base world scenario may be staged in the closed course environment, and an AV may interact with the various variations so that additional sensor data and processed sensor data may be obtained. How many variations are staged in the closed course environment may depend, as an example, on the importance value assigned to the base world scenario, and/or the difference value generated for the closed course scenarios.

According to some embodiments, the method includes receiving closed course scenario sensor data from the AV at step 440. For example, a closed course staging system may receive closed course scenario sensor data from the AV. The closed course scenario sensor data is obtained by the AV during the interaction with the closed course scenario, and any variations thereof that are staged by the closed course staging system.

According to some embodiments, the method includes processing the closed course scenario sensor data to obtain test results data at step 445. For example, a closed course staging system may process the closed course scenario sensor data to obtain processed sensor data. Additionally or alternatively, all or any portion of the sensor data may be processed by the AV to obtain processed sensor data, which may then be provided to the close course staging system. In one or more embodiments, the sensor data and processed sensor data obtained during (or based on) the AV's interaction with the closed course scenario, and any staged variations thereof, may be referred to as test results data.

According to some embodiments, the method includes processing the test results data to obtain a relevance score at step 450. For example, a closed course staging system may process the test results data to obtain a relevance score. In one or more embodiments, a relevance score is based on how the AV performed during the testing in the closed course scenario and any variations thereof. As an example, a relevance score may be higher for test runs during which one or more actions performed by the AV are identified as unsafe or potentially unsafe. As another example, a relevance score may be higher for test runs during which one or more actions performed by the AV were unexpected (e.g., the actions of the AV caused by a ML model of the AV in response to the scenario were unexpected).

According to some embodiments, the method includes updating AV software based on the test results data, the difference value, and the relevance score at step 455. For example, a closed course staging system may update AV software based on the test results data, the difference value, and the relevance score. Updating the AV software may include adding the test results data to a training data set for training a machine learning model for AVs. Using the updated one or more ML models trained using the added training data gained from the AVs interactions with the closed course scenario may improve the performance of the one or more ML models, and, thus, the AV, when scenarios similar to the base world scenario are encountered by an AV entity.

Figure 5:
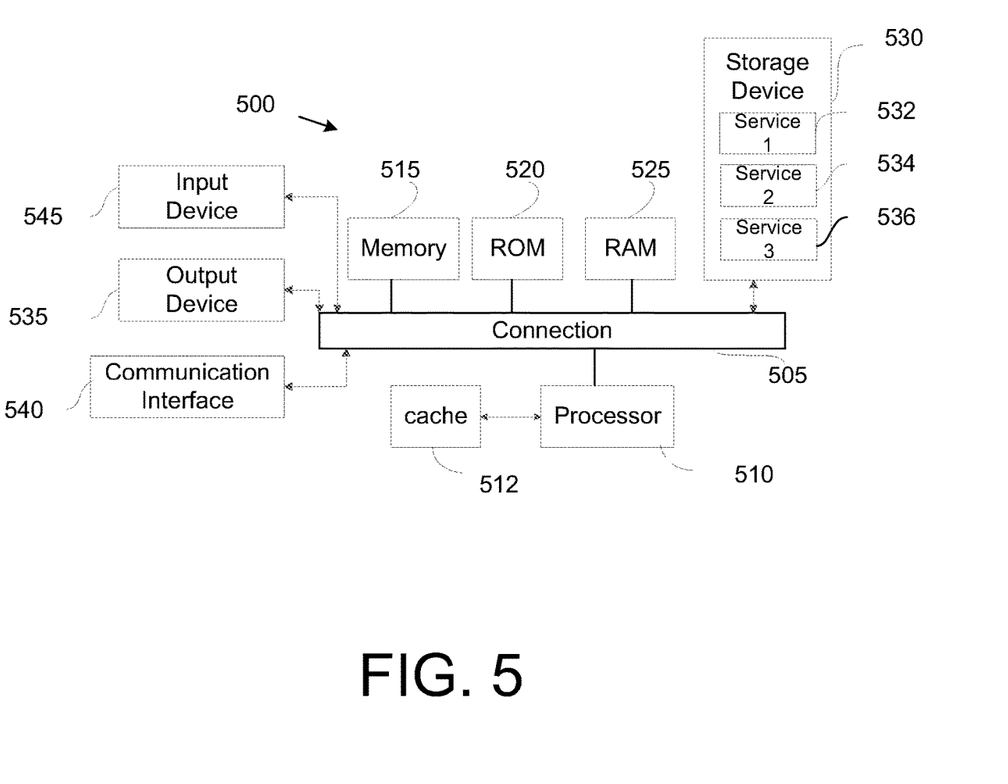
FIG. 5 shows an example of a system for implementing certain aspects of the present technology.

FIG. 5 shows an example of computing system 500, which can be for example any computing device making up a closed course staging system, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Figure 6:
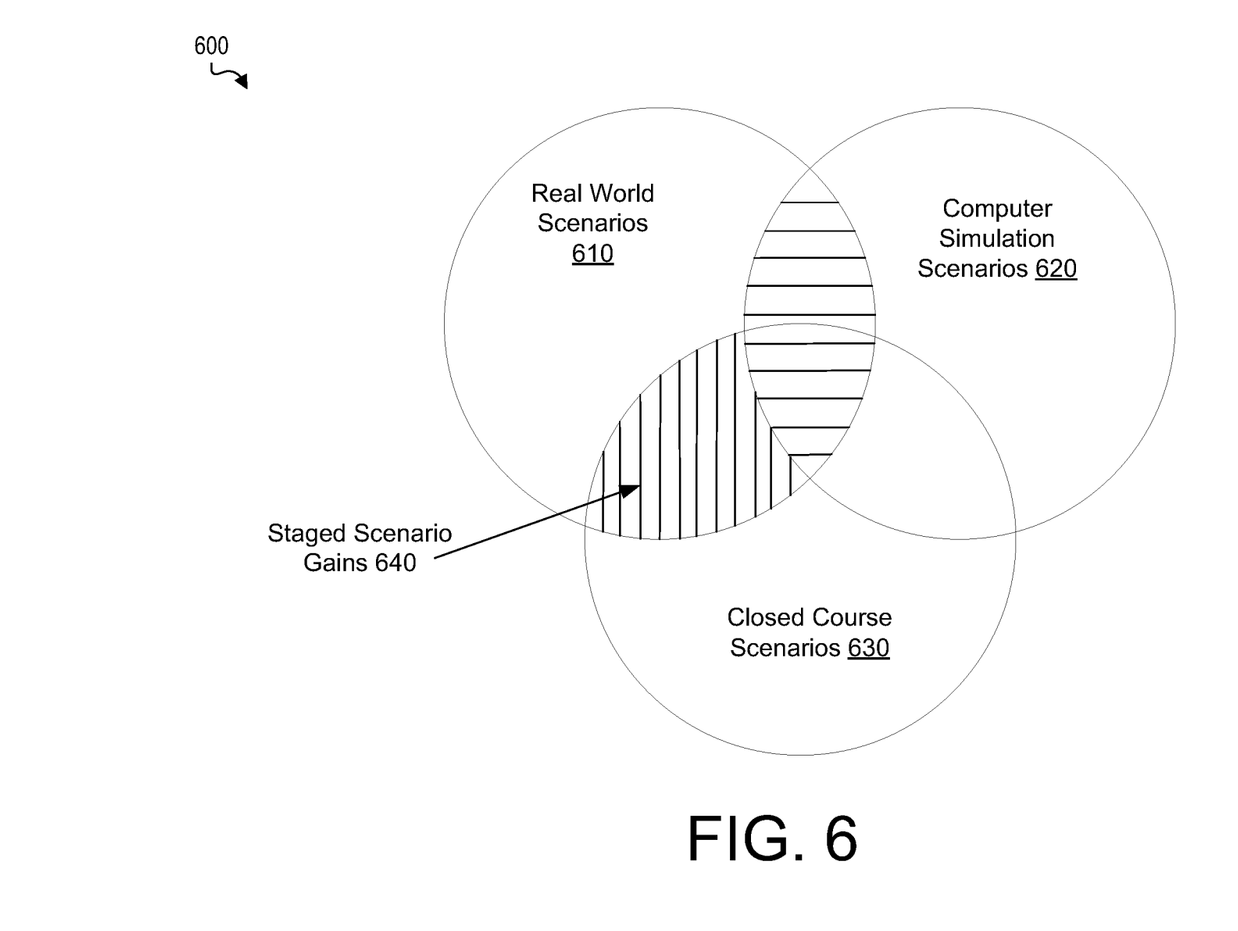
FIG. 6 illustrates an example Venn diagram representing certain aspects of the present technology.

Turning to FIG. 6, FIG. 6 shows a Venn diagram 600. Venn diagram 600 shows three overlapping circles representing the different types of data sources from which data may be obtained for training ML models for AVs. The data sources include real world scenarios 610, computer simulated scenarios 620, and closed course scenarios 630. AV sensor data and processed AV sensor data may be obtained based on any scenarios in any of the three circles shown. The three circles of Venn diagram 600 overlap. For example, real world scenarios may be used in constructing computer simulated scenarios, computer simulation scenarios may be used to set up a closed course environment, etc. Staged scenario gains 640 represent the enablement of learning aspects for AV ML models that may not be possible without the use of embodiments described herein. In one or more embodiments, by selecting important scenarios to stage in a closed course environment, training data for ML models may be augmented to include more data related to such important scenarios, thereby improving the training, and, thus, the performance of an AV using the model.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

What is claimed is:

1. A method for continuous learning for machine learning models of autonomous vehicles (AVs), the method comprising:
   receiving sensor data from an AV entity, wherein the sensor data is obtained from a base world scenario perceived by the AV entity;
   processing the sensor data to obtain processed sensor data; assigning an importance value to the base world scenario; determining that the importance value is above an importance value threshold; staging, in response to the determination, a closed course scenario based on the sensor data and the processed sensor data;
   generating a difference value representing differences between the closed course scenario and the base world scenario;
   receiving closed course scenario sensor data from the AV entity, wherein the closed course scenario sensor data is obtained by the AV entity during an interaction between the AV entity and the closed course scenario;
   processing the closed course scenario sensor data to obtain test results data; processing the test results data to obtain a relevance score;
   updating AV entity software based on the test results data, the difference value, and the relevance score; and
   operating the AV entity in the base world scenario utilizing the updated AV entity software via a local computing system operably connected to one or more mechanical systems on the AV entity.

2. The method of claim 1, wherein updating the AV entity software comprises adding the test results data to a training data set and training a new machine learning model for AV entities based on the added test results.

3. The method of claim 1, wherein the base world scenario comprises a real world scenario and the AV entity comprises a physical AV entity.

4. The method of claim 1, wherein the base world scenario comprises a computer simulated scenario and the AV entity comprises a simulated AV entity.

5. The method of claim 1, wherein generating the difference value comprises performing a comparison between the base world scenario and the closed course scenario.

6. The method of claim 5, wherein performing the comparison comprises identifying objects that are present in the base world scenario and are not present in the closed course scenario.

7. The method of claim 5, wherein performing the comparison comprises quantifying differences in shape and orientation of an object present in the base world scenario and represented in the closed course scenario.

8. The method of claim 1, wherein the relevance score is based at least in part on identifying that a safety determination or an expectancy determination for an AV entity action during the interaction satisfies predetermined criteria.

9. The method of claim 1, wherein the interaction is one of a plurality of interactions between the AV entity and variations of the closed course scenario, and wherein the test results data comprises sensor and processed sensor data from each of the plurality of interactions.

10. A non-transitory computer readable medium comprising instructions, the instructions, when executed by a computing system, cause the computing system to:
  receive sensor data from an AV entity, wherein the sensor data is obtained from a base world scenario perceived by the AV entity:
  process the sensor data to obtain processed sensor data:
  assign an importance value to the base world scenario;
  determine that the importance value is above an importance value threshold:
  stage, in response to the determination, a closed course scenario based on the sensor data and the processed sensor data:
  generate a difference value representing differences between the closed course scenario and the base world scenario:
  receive closed course scenario sensor data from the AV entity, wherein the closed course scenario sensor data is obtained by the AV entity during an interaction between the AV entity and the closed course scenario:
  process the closed course scenario sensor data to obtain test results data:
  process the test results data to obtain a relevance score:
  update AV entity software based on the test results data, the difference value, and the relevance score; and
  direct operation of the AV entity utilizing the updated AV entity software via a local computing system operably connected to one or more mechanical systems on the AV entity.

11. The non-transitory computer readable medium of claim 10, wherein updating the AV entity software comprises adding the test results data to a training data set and training a new machine learning model for AV entities based on the added test results.

12. The non-transitory computer readable medium of claim 10, wherein the base world scenario comprises a real world scenario when the AV entity is a physical AV entity, and wherein the base world scenario comprises a computer simulated scenario when the AV entity is a simulated AV entity.

13. The non-transitory computer readable medium of claim 10, wherein generating the difference value comprises performing a comparison between the base world scenario and the closed coursed scenario.

14. The non-transitory computer readable medium of claim 13, wherein performing the comparison comprises identifying objects that are present in the base world scenario but not in the closed course scenario.

15. The non-transitory computer readable medium of claim 13, wherein performing the comparison comprises quantifying differences in shape and orientation of an object present in the base world scenario and represented in the closed course scenario.

16. The non-transitory computer readable medium of claim 10, wherein the relevance score is based at least in part on identifying that a safety determination or an expectancy determination for an AV entity action during the interaction satisfies predetermined criteria.

17. The non-transitory computer readable medium of claim 10, wherein the interaction is one of a plurality of interactions between the AV entity and variations of the closed course scenario, and wherein the variations of the closed course scenario, and the test results data comprises sensor and processed sensor data from each of the plurality of interactions.

18. A system for continuous learning for machine learning models of autonomous vehicles (AVs), comprising:
  a storage configured to store instructions; and
  a processor configured to execute the instructions and cause the processor to:
    receive sensor data from an AV entity, wherein the sensor data is obtained from a base world scenario perceived by the AV entity:
    process the sensor data to obtain processed sensor data:
    assign an importance value to the base world scenario:
    determine that the importance value is above an importance value threshold: stage, in response to the determination, a closed course scenario based on the sensor data and the processed sensor data:
    generate a difference value representing differences between the closed course scenario and the base world scenario:
    receive closed course scenario sensor data from the AV entity, wherein the closed course scenario sensor data is obtained by the AV entity during an interaction between the AV entity and the closed course scenario:
    process the closed course scenario sensor data to obtain test results data: process the test results data to obtain a relevance score; and update AV entity software based on the test results data, the difference value, and the relevance score;
  wherein the AV entity is operated in the base world scenario utilizing the updated AV entity software via a local computing system operably connected to one or more mechanical systems on the AV entity.

19. The system of claim 18, wherein, to update the AV entity software, the processor is further configured to execute further instructions for adding the test results data to a training data set and training a new machine learning model for AV entities based on the added test results.

20. The system of claim 18, wherein, to generate the difference value, the processor is further configured to execute further instructions for performing a comparison between the base world scenario and the closed course scenario, and wherein performing the comparison comprises:
  identifying objects that are present in the base world scenario but not in the closed course scenario; and
  quantifying differences in shape and orientation of an object present in the base world scenario and represented in the closed course scenario.

* * * * *